United States Patent Office 3,627,510
Patented Dec. 14, 1971

3,627,510
PROCESS FOR GASEOUS REDUCTION OF
OXYGEN CONTAINING COPPER
John Vogt and Paul Schmidt, Noranda, Quebec, and
Leonard Mills, Murdochville, Quebec, Canada, assignors to Noranda Mines Limited, Toronto, Ontario, Canada
Filed Jan. 9, 1968, Ser. No. 696,526
Claims priority, application Canada, Nov. 20, 1967, 5,563
Int. Cl. C22b 9/08, 15/14
U.S. Cl. 75—76                                    18 Claims

ABSTRACT OF THE DISCLOSURE

In order to reduce the oxygen content of molten copper in a furnace, a reductant comprising unreformed natural gas, a gaseous hydrocarbon, or mixtures thereof is injected below the surface of the molten copper. The reductant may be used alone or in combination with steam. So as to achieve satisfactory reduction of the oxygen-containing copper, the reductant is preferably injected at a high pressure, pressures above 30 p.s.i.g. and as great as 100 p.s.i.g. being utilized, or optionally the reductant is preheated (prior to injection) to a temperature close to that of the molten copper. The injection of the reductant into the furnace is continued until the oxygen content of the molten copper is reduced to a desired level.

This invention relates to the pyrometallurgical refining of molten copper by the consecutive steps of oxidation and reduction. More particularly, it provides a process utilizing a gaseous reductant for the removal of undesirable oxygen contained in the molten copper.

Copper has been pyrometallurgically refined for many hundreds of years by essentially unchanged methods. Agricola in "De Re Metallica" published in 1556 describes a process which has changed so little that the work could have been written in the twentieth century. Essentially the process involves the "poling" of a molten bath of copper with a pole of green timber in a reducing atmosphere. The pole is pushed below the surface of the molten copper where it causes violent agitation by the rapid evaporation of moisture and volatile matter from the green wood and forces the molten copper into a fountain in the highly reducing atmosphere maintained in the furnace.

Many workers have suggested alternatives to the poling procedure, which involves cumbersome, arduous and hot labour on the part of the operatives and which is expensive in view of the growing scarcity of suitable timber poles. Among the suggestions are the use of other reducing agents such as coal, charcoal, petroleum or manufactured reducing gases. One notable attempt to use natural gas is described in "Journal of Metals," August 1961, p. 545–547 by Leonard Klein, wherein it was found that the reducing effect of nautral gas on molten copper is small and intolerably slow. This failure led Klein and his coworkers to the conclusion that natural gas should be reformed to hydrogen and carbon monoxide before being introduced into the refining furnace. Several expensive reforming plants were built in association with copper refining facilities and a process which employs pressures up to about 15 p.s.i.g. is fully described in U.S. Pat. No. 2,989,397 to Kuzell et al., June 20, 1961.

It has now, surprisingly, been found that copper may be economically refined to an acceptable metallurgical standard by unreformed natural gas when used according to the present invention.

In the practice of one aspect of the present invention the reductant, which is preferably unreformed natural gas but which may also be propane, butane, pentane, ethane or other gaseous or liquid hydrocarbons either alone or in admixture with steam or air is injected at a pressure in excess of 30 p.s.i.g. and at normal temperatures through a tuyere into the molten bath of copper.

By another aspect of this invention a reductant gas is injected into a bath of molten copper through a tuyere at pressures up to about 30 p.s.i.g. and at sufficiently elevated temperatures up to about the temperature of the molten copper.

Without wishing to be bound by this explanation it is believed that when reductant gases are introduced to the bath at relatively high pressures with an attendant relatively high exit velocity, the large velocity and density differences between the gas jet and the liquid bath result in a high degree of instability and any large bubbles which are injected initially into the bath are shattered into very fine small bubbles. Consequently a high specific surface area is achieved and the heat and mass transfer as well as the chemical action between the gas and the liquid bath are very high. One result of this high heat transfer is that hydrocarbons such as methane (the principal constituent of natural gas) and propane, are very quickly pyrolized to hydrogen and carbon which react with the copper oxide in the melt. Therefore, it is possible to obtain a very high utilization efficiency of the gas during its relatively short residence time in the liquid bath. Also, the use of high pressure allows the reducing gas to be introduced at deeper depths below the surface of the copper bath thereby giving the gas additional residence time in the melt. High velocity and deep immersion give better mixing which results in more efficient use of the reductant. Similarly injection of hydrocarbon at sufficiently high temperatures also results in rapid pyrolysis of the hydrocarbon to carbon and hydrogen which react with the copper oxide in the melt.

In the drawings which are illustrative of the present invention:

Figure 1:
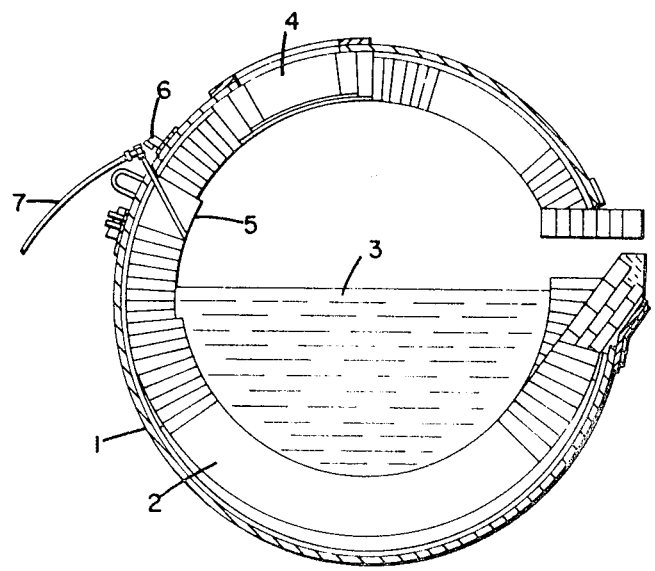
FIG. 1 is a section of a rotary copper refining furnace.
Figure 2:
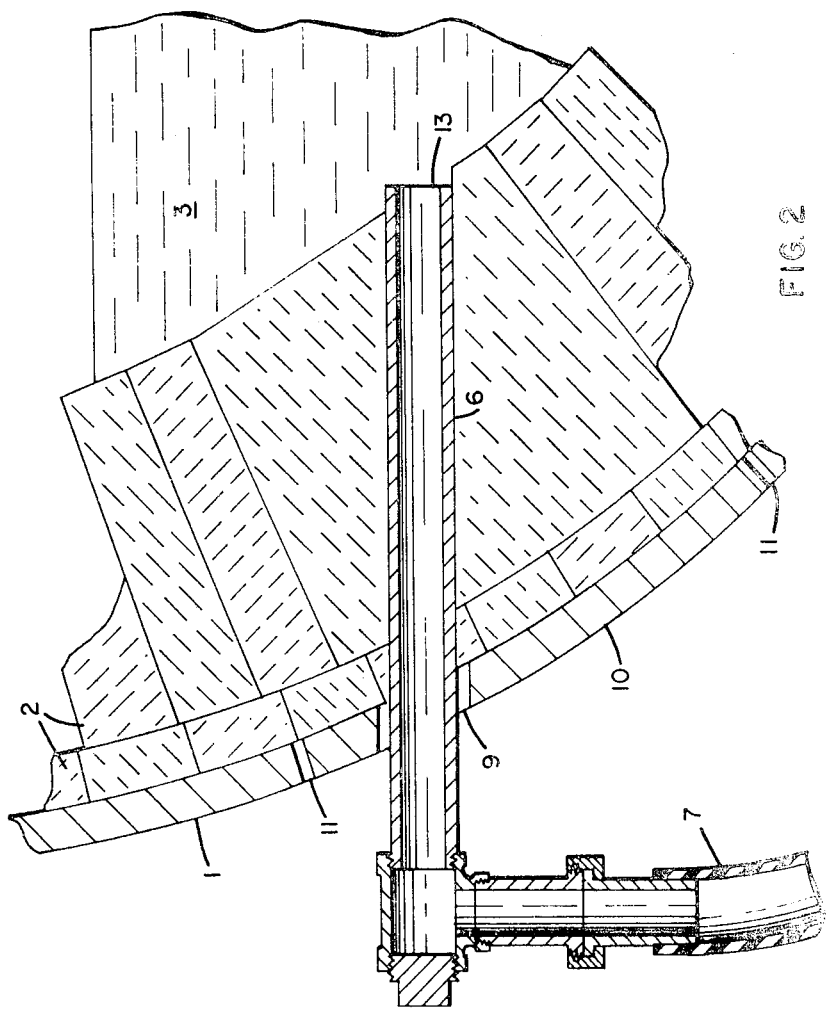
FIG. 2 is a section of a tuyere according to the prior art.
Figure 3:
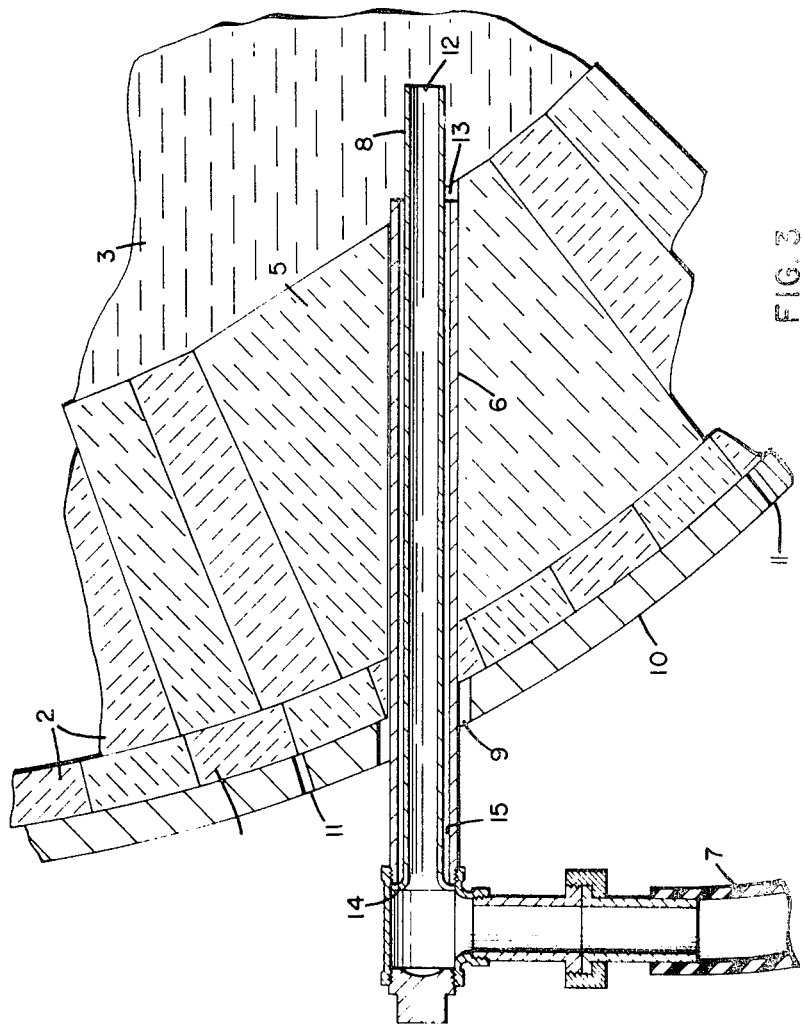
FIG. 3 is a section of an alternative tuyere according to the prior art.

Referring now to FIGS. 1, 2 and 3 in detail, and according to the prior art, copper may be refined in a cylindrical furnace, shown generally at 1 (FIG. 1) having a refractory brick lining 2. Molten copper 3 is introduced into the furnace via skimming and fill port 4 and the furnace is rotated so that the tuyere brick 5 and its associated tuyere pipe 6 is beneath the level of the molten copper, as shown in FIG. 2. Reducing gas is normally introduced to the furnace via two tuyeres 6 and hoses 7, located one near each end of the furnace. FIG. 3 shows an alternative tuyere form in which an inner tuyere pipe 8 is inserted inside tuyere pipe 6. During operation molten copper freezes to a greater or lesser extent over the end of and up into the tuyeres at 12 and 13, thereby reducing the cross sectional area and the gas flow. This usually occurs gradually, the rate of plugging being a function of the depth of immersion and the amount of superheat in the copper. Usually, and probably several times during a refining cycle, it is necessary to rotate the furnace so that the tuyeres come out of the copper and to shut off the gas and unplug the tuyeres with a reaming bar and sledge hammer. Plugging of the end of the tuyeres and hence low gas flow results in overheating of the tuyere insert and thus leaves the pipe in a weakened condition.

Repeated reaming often results in breaking off the weakened portion of pipe which may necessitate expensive and time consuming repairs.

Figure 4:
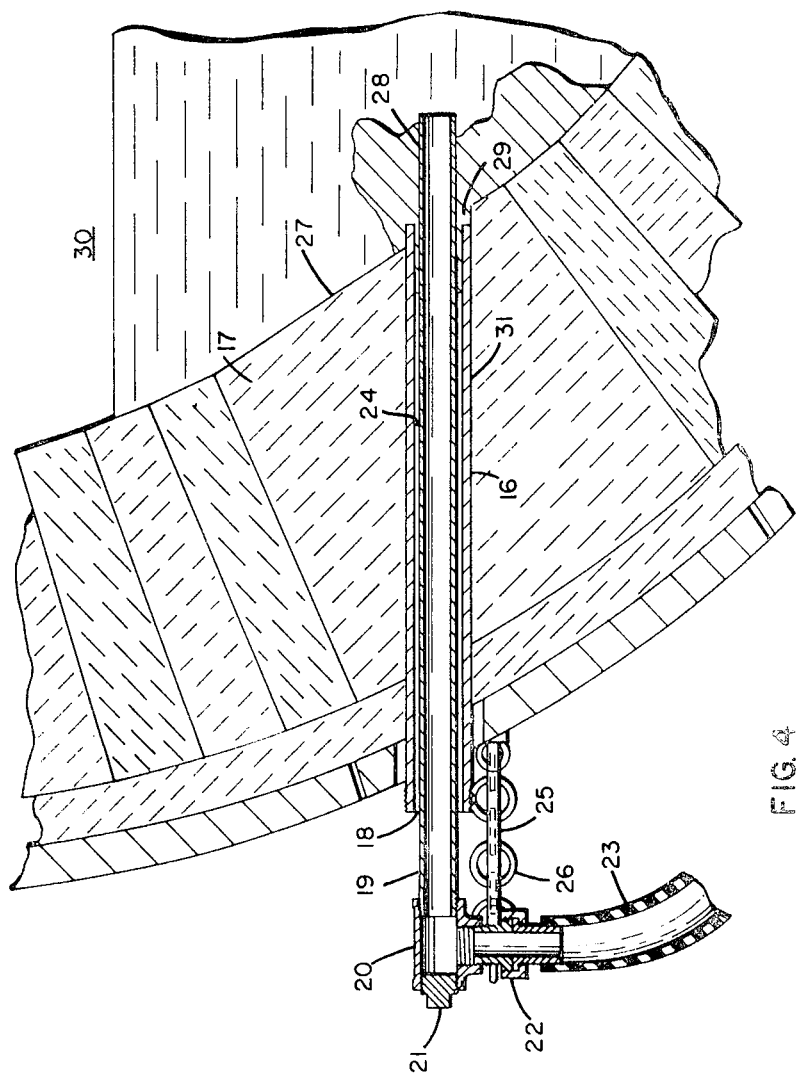
FIG. 4 is a section of the tuyere according to the present invention.

A further problem with the prior art techniques is that of blow back, which may occur when a tuyere insert 8 becomes blocked or burns back to the face of the brick. Reducing gas flows between the large pipe 6 and the brick 5, and emerges to atmosphere around the pipe 6 at 9 or around the removable shell plate 10 at 11. In the tuyere of the type shown in FIG. 3, gas also flows around the swaged end 14 of insert pipe 8, into the annular space 15 and hence finds its way back between pipe 6 and tuyere brick 5. The gas may ignite as it enters the atmosphere in which case an intense flame results which endangers the steel work and trailing rubber hoses 7. If the gases do not ignite there is a danger that explosive pockets of gas may form. In the present invention, an embodiment of which is shown in FIG. 4, the above disadvantages are overcome.

Therefore, according to one aspect of the present invention, a high pressure process for treating oxygen containing molten copper in a furnace to reduce the oxygen content comprises injecting a reductant below the surface of said copper at a pressure from at least sufficient to overcome the hydrostatic head of said copper to at least 100 p.s.i.g., provided that when the reductant gas is methane or natural gas and said pressure is less than about 30 p.s.i.g. said reductant is preheated to a temperature up to a maximum temperature of about that of said molten copper.

Referring to the drawings, an outer pipe 16 is grouted into a hole in the tuyere brick 17 by known techniques, open to atmosphere at 18. Pipe 16 may be made of any grade of steel, preferably stainless steel of such grades as Types 309, 310 and 316, and for longest life Type 446 ferritic stainless has been found most suitable. A second pipe 19 which can be of any convenient material such as "black iron" or mild steel but with an alloy extension 28 welded to the hot end, preferably of stainless steel such as Type 446 ferritic, slides inside pipe 16 and actually carries the reducing gas via the pipe T 20 and fitting 22 from hose 23 and the gas source (not shown). Pipe T 20 is provided with a pipe plug 21 for cleanout and inspection purposes. Pipes 16 and 19 are selected so that they are convenient sliding fits, for example if pipe 16 is 1.380 inches I.D. then pipe 19 is conveniently 1.050 inches O.D. and if pipe 16 is 1$\frac{15}{16}$ inches I.D. then pipe 19 could be 1.66 inches O.D. Pipe 19 may be coated with a refractory material (such as the aluminum silicate mortar sold under the trademark "KYANEX") to ensure a good fit and to prevent fusion of the two pipes during service. A spacer 25 is installed between the furnace wall and T 20 to prevent the tip 28 from projecting too far into the furnace. A chain 26 is also attached to T 20 and the furnace shell to prevent the pipe 19 sliding out of pipe 16 through the jet action of the issuing gas or when the furnace is rotated. The hot end 28 of the pipe may extend to any length into the furnace beyond the hot wall face 27, but lengths in excess of 5" are unnecessary and may bend or result in premature burn out. If they bend upwardly the reductant will be directed toward the bath surface rather than the body of the bath. Preferably a length of 3–4 inches is maintained, inserting the pipe further as the end is burnt off. The pipe may be used until it becomes flush or slightly countersunk with the hot wall face 27, at which point the possibility of blowback occurs. A somewhat similar tuyere block has been described in Canadian Pat. 673,243 to Hall, Oct. 29, 1963, but in this reference the two pipes are maintained flush with the hot wall face and the inner pipe does not extend into the furnace, and furthermore the two pipes become fused together in service to prevent blow back. The present invention specifically avoids the fusion of the two pipes as this prevents relative movement between the two pipes.

In operation the tuyeres 19 are inserted to extend about 3–4 inches into the furnace and the furnace is filled to within about 2 or 3 inches of the tuyere pipe as in FIG. 1. An appropriate gas, for either an oxidizing or reducing reaction is then introduced through the tuyeres and the furnace is slowly rotated until the tuyere tip 28 is submerged below the surface of the molten copper. The depth to which the tip is submerged depends somewhat on the operating pressures available and may be any depth up to about 30–36 inches. Initially it is possible that some liquid copper flows into the annular space 31 between the inner and outer pipes and freezes to form a solid seal 29. This seal may help to prevent blow back but is not considered essential or even important, as the pipe diameters are closely matched and any copper which does so freeze is minor, and does not prevent later relative movement between the pipes 16 and 19. As the pipe 19 burns back, the spacer 25 can be removed and pipe 19 advanced 3 or 4 inches into the furnace and a shorter spacer 25 inserted. This process may be repeated until all of the tip 28 has been consumed.

When a tuyere of this design is employed the possibility of blow back is almost eliminated and relatively high gas pressures may be employed, as will be discussed hereinafter. The need for reaming the tuyere during the refining cycle is virtually eliminated as the high pressure gas prevents copper from splashing back into the tuyere and freezing and hence eliminates blocking. A greatly increased gas flow is achieved which does not fall off significantly with a gradually blocking tuyere and this makes it possible to operate with a single tuyere rather than two. Furthermore it is not necessary to begin with shallow submersion when the copper is cold, as when low gas pressure is used, in order to reduce the tendency of the tuyere to plug.

It is emphasized that this invention is capable of using reductants at high pressures with the use of the tuyere described herein. Gas pressures, using natural gas, up to about 100 p.s.i.g. have been used with a tip immersion of about 30 inches, and higher pressures and deeper immersions could be employed, depending on the availability of high pressure gas handling equipment. Pressures as low as about 15 p.s.i. can be used for reductants other than methane. It has been found that at low pressures the time for complete reduction is prolonged so that normally pressures in excess of about 30 p.s.i.g. are employed. If low pressures of the order 7–15 p.s.i.g. are employed, preheating of the reductant gas improves the reaction rate and efficiency of gas utilization.

EXAMPLE 1

A 13' x 30' anode furnace was charged with 250–300 tons of copper, and deoxidized using gaseous propane admixed with steam injected through one tuyere at a line pressure of 70X80 p.s.i. With 100–150 c.f.m. and a tuyere immersion of about 30 inches a high turbulence was created in the bath resulting in exceptionally high efficiency in reducing gas utilization. The charge was completely deoxidized in 80–100 minutes, and required 1.12 gallons of propane per ton of copper which compares more than favourably with the usual 1.65 gallons/ton reported by smelters employing low pressure propane.

As previously indicated unreformed natural gas is a preferred reductant as it has a number of practical advantages over propane or other manufactured reductants including:

(a) lower cost—only about one third of the cost of propane per ton of copper refined.

(b) ready availability at many smelter sites, particularly in North America.

(c) simplified piping and control system.

(d) difficulties stemming from (b) storage tanks, pumps, and vaporizers are eliminated.

(e) use of natural gas according to the present invention eliminates the requirement for a propane vaporizer or natural gas reformer, which represents a major capital saving, and (f) the volume of objectionable black smoke, normally generated when deoxidizing with propane, is substantially reduced.

The following examples illustrate the efficiency of natural gas operations.

EXAMPLE 2

A visual check of the single ¾ inch 446 stainless steel tip tuyere used in the furnace of Example 1 was made to insure that it extended at least ½ inch into the bath and preferably 2–3 inches. The furnace was then charged with copper and oxidized by blowing air at 45 p.s.i.g. into the bath through the submerged tuyere. Slag was skimmed as necessary and samples taken until the visual observation of a sample revealed complete removal of sulphur. This took about 20 minutes at a bath temperature of 2250° F.

The refining stage was then started by substituting the air supply to the tuyere with natural gas. The tuyere was maintained at about 30 inches below the copper bath surface during the refining stage and the heating burner was turned off. Natural gas was injected at 370 c.f.m. for 90 minutes and then the flow was reduced to 325 c.f.m. for 20 minutes at a supply line pressure of 85 p.s.i.g. and an inlet tuyere pressure of 65 p.s.i.g. The temperature at the end of the refining stage was 2160° F. Steam was also injected mixed together with methane at 85 c.f.m. for 90 minutes and 115 c.f.m. for 20 minutes.

It was estimated that at the end of the oxidizing stage that the oxygen content of the copper was 0.85% and at the end of the refining stage 0.1%. With a production of 290 tons of anode copper and a total natural gas consumption of 41,236 cu. ft. this represents a consumption rate of 142 cu. ft./ton and an efficiency of 63.4%, based on a theoretical rate of 90 ft.$^3$/ton.

EXAMPLE 3

The same procedure to that of Example 2 was carried out under similar conditions of bath temperatures and gas pressures. The bath was oxidized and skimmed for 30 minutes to yield a blister copper having an oxygen content of 0.85%. Natural gas was then injected at 240 c.f.m. and 85 p.s.i.g. line pressure (tuyere inlet pressure 65 p.s.i.g.), for 165 minutes. Steam was also injected at 85 c.f.m. A total of 39,750 ft.$^3$ of natural gas was consumed to produce 280 tons of anode copper which had an estimated oxygen content of 0.10%. Based on a theoretical consumption of 90 cu.ft./ton of anode copper produced, this utilization corresponds to an efficiency of 63.3%.

In carrying out Examples 2 and 3 it was observed that the volume of black smoke generated was much less than the serious and objectionable amounts generated in the test of Example 1.

EXAMPLE 4

In another run the bath was oxidized and skimmed for 30 minutes to yield a blister copper having an oxygen content of 0.85%. Natural gas was then injected at 430 c.f.m. and 85 p.s.i.g. line pressure (tuyere inlet pressure 65 p.s.i.g.), for 95 minutes. No steam was used in this run. A total of 38,450 ft.$^3$ of natural gas was consumed to produce 270 tons of anode copper which had an estimated oxygen content of 0.10%. Based on a theoretical consumption of about 90 cu.ft./ton of anode copper produced, this utilization corresponds to an efficiency of about 63%.

The following examples illustrate the effects of low pressures and preheated methane as the reductant.

EXAMPLE 5

In a laboratory experiment, a 230 lb. melt of anode copper, heated to 2120° F. in an oil fired pot furnace was treated with commercially pure methane by injecting said gas 3.5 inches below the surface of the melt at a flowrate of .5 s.c.f.m. and a pressure of 2.7 p.s.i.g. The methane was preheated to or near the temperature of the melt by firstly passing it through a pipe of 1 inch normal diameter, 2 to 3 feet of said pipe being surrounded and heated by the hot flue gases of the furnace. It was found that the oxygen content decreased from .65 to .53% oxygen (w./w.) during a period of 2.3 minutes of the above treatment.

EXAMPLE 6

In another experiment similar to Example 5 but injecting the methane 5.9 inches below the surface of the melt at a pressure of 3.2 p.s.i.g. all other conditions remaining the same, the oxygen content in the copper melt was found to decrease from .53% oxygen to .10% oxygen during a period of 9.1 minutes of said treatment.

EXAMPLE 7

In still another experiment the gases issuing from the melt were analyzed while a 270 lb. melt of copper, containing .55% oxygen (w./w.) was undergoing a similar treatment. Methane was injected 3.2 inches below the surface at a flowrate of .89 s.c.f.m. and a pressure of 3.4 p.s.i.g., all other conditions remaining the same. It was then found that the gas mixture, after reacting in the melt, yielded the following analysis of major constituents:

| | Percent |
|---|---|
| $H_2O$ | [1] 42 |
| $CO_2$ | 24 |
| $CO$ | 13 |
| $H_2$ | 14 |
| $CH_4$ | 3.3 |

[1] Calculated from a material balance of gas input-gas output.

The above analysis indicates that most of the gas has been utilized in removing oxygen from the copper melt and it can be shown that a gas utilization efficiency approximating 70% of the injected methane is achieved. Examples 4–6 clearly show that the rate of reaction is not merely a function of pressure but also a function of temperature. Although it is preferred, from a practical, economic position, to employ relatively high pressure reductant gas at ambient temperatures, the use of relatively low pressures at temperatures up to about the temperature of the molten copper bath also falls within the scope of the present invention.

Figure 5:
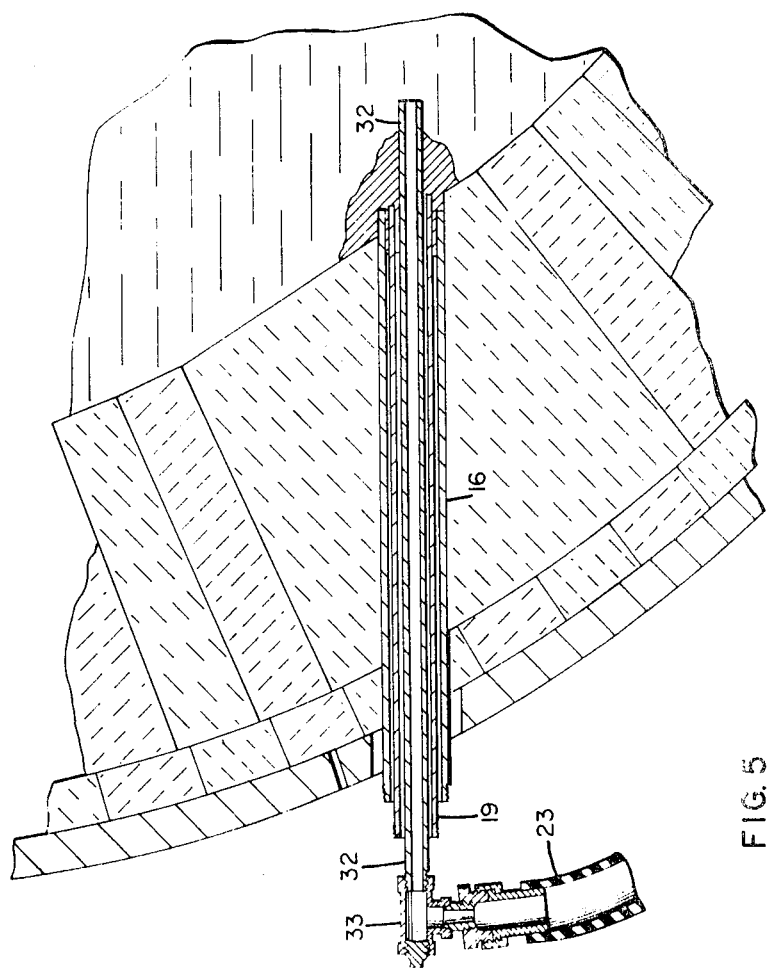
FIG. 5 is a section of an alternative embodiment of the tuyere according to the present invention.

If the pipe 19 is consumed to the end of its useful life during a refining cycle or becomes so firmly wedged in the pipe 16 due to freezing copper in annular space 31 that further advance into the furnace is impossible, then the expedient as shown in FIG. 5 may be adopted in order to effect a temporary repair. The hose 23 is disconnected from the inner pipe 19 and the T 20 removed. A ¾ inch stainless steel pipe 32 is inserted into pipe 19 to extend beyond the hot wall face 27 into the furnace. A smaller T 33 is then screwed onto pipe 32 and connected, by suitable adapters to hose 33. The refining can then proceed with only minimal delay and it has been found that the reduced gas flow resulting from the smaller diameter pipe can be compensated by the higher pressure which can be achieved.

Figure 6:
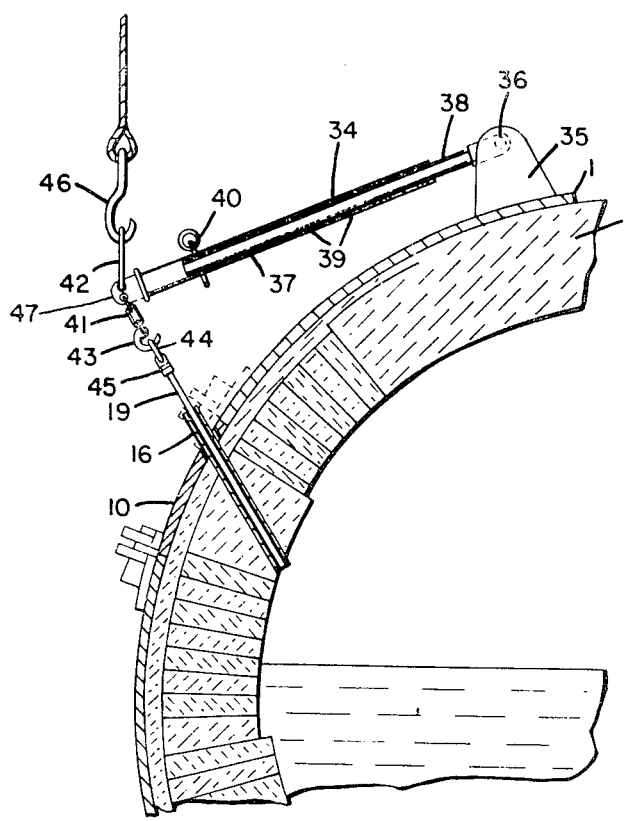
FIG. 6 is a section of a furnace showing an extraction device for a tuyere of the present invention.

When it becomes necessary for a tuyere to be extracted from the furnace, a crane is required to pull out the pipe 19. It is desirable that the direction of pull should be along the centreline of the pipe and with a converter aisle crane this is difficult to achieve. The expedient shown in FIG. 6 overcomes the attendant problems. An arm 34 is pivotally mounted on the furnace shell 1 by lugs 35 and pivot pin 36. The arm 34 consists of two concentric pipes 37 and 38 which slide freely together and are provided with paired holes 39 into which a pin 40 may be inserted to lock said pipes together at any desired length. A special clevis 47 is welded at the free end of arm 34 and includes two eyes through which are attached a short chain 41 and a loop 42. Chain 41 has a hook 43 attached to its end for engagement with a loop 44 and adapter 45 which in turn is screwed onto pipe 19. Loop 42 receives crane hook 46. In use, arm 34 is adjusted to the desired length and the crane pulls the pipe 19 out of pipe 16 for a few inches. The direction of pull changes slowly as the pipe 19 emerges and the length of arm 34 is adjusted, as described by means of pin 40 and holes 39. Of course, this extractor can be used for any of pipes 16, 19 and 32 by selection of suitable adaptors 45.

We claim:
1. A process for gaseous deoxidation of molten copper contained in a furnace to reduce the oxygen content thereof, which process includes the steps of:
   (a) injecting below the surface of said molten copper a reductant comprising unreformed natural gas, a gaseous hydrocarbon, or mixtures thereof.
   (b) the injection of said reductant being effected under one of the following conditions:
      (i) at a pressure in excess of 30 p.s.i.g.,
      (ii) said reductant being preheated to a sufficiently high temperature up to about the temperature of the molten copper; and
   (c) continuing said injection until the oxygen content of the molten copper is reduced to a desired level.

2. A process for gaseous deoxidation of molten copper contained in a furnace to reduce the oxygen content thereof, which process includes the steps of:
   (a) injecting at a pressure in excess of 30 p.s.i.g. and below the surface of said molten copper a reductant comprising unreformed natural gas, a gaseous hydrocarbon, or mixtures thereof; and
   (b) continuing said injection until the oxygen content of the molten copper is reduced to a desired level.

3. A process for gaseous deoxidation of molten copper contained in a furnace to reduce the oxygen content thereof, which process includes the steps of:
   (a) injecting below the surface of said molten copper a reductant comprising unreformed natural gas, a gaseous hydrocarbon, or mixtures thereof, said reductant being preheated to a sufficiently high temperature up to about the temperature of the molten copper prior to injection; and
   (b) continuing said injection until the oxygen content of the molten copper is reduced to a desired level.

4. A process as defined in claim 1 in which said gaseous hydrocarbon comprises methane, ethane, propane, butane, or pentane.

5. A process as defined in claim 4 in which said reductant is injected below the surface of the molten copper in combination with steam.

6. A process as defined in claim 3 in which said reductant comprises unreformed natural gas having methane as its principal constituent, methane, or mixtures thereof.

7. A process as defined in claim 2 in which said reductant comprises unreformed natural gas having methane as its principal constituent, methane, ethane, propane, or mixtures thereof, and in which said reductant is injected into the molten copper at a pressure between about 30 p.s.i.g. and 100 p.s.i.g.

8. A process as defined in claim 7 in which said reductant is injected below the surface of the molten copper in combination with steam.

9. A process as defined in claim 7 wherein said reductant is injected into the furnace containing the molten copper via a tuyere.

10. A process as defined in claim 9 wherein said reductant is injected into the furnace at a depth of between about 30 and 36 inches below the surface of the molten copper.

11. A process as defined in claim 6 wherein said reductant is preheated, prior to injection, to a temperature approximating that of said molten copper and at least exceeding about 1500° F.

12. A process as defined in claim 11 wherein said reductant is injected below the surface of the molten copper in combination with steam.

13. A process as defined in claim 11 wherein said reductant is injected into the furnace containing the molten copper via a tuyere.

14. A process as defined in claim 7 in which said reductant is injected into the molten copper at an inlet pressure between about 65 and 85 p.s.i.g.

15. A process as defined in claim 14 in which said reductant is injected below the surface of the molten copper in combination with steam.

16. A process for gaseous deoxidation of molten copper contained in a furnace to produce anode copper, which comprises injecting unreformed natural gas below the surface of said molten copper at a pressure in excess of 30 p.s.i.g. and continuing said injection until the oxygen content of the molten copper is reduced to the level of anode copper.

17. A process as defined in claim 16, in which said reductant is injected at a pressure up to about 100 p.s.i.g.

18. A process as defined in claim 16, in which said reductant is injected at a pressure between about 65 and 85 p.s.i.g.

References Cited

UNITED STATES PATENTS

| | | | |
|---|---|---|---|
| 57,969 | 9/1866 | Reese | 266—25 |
| 2,989,397 | 6/1961 | Kuzell | 75—76 |
| 3,528,802 | 9/1970 | Morris | 75—76 |
| 3,529,956 | 9/1970 | Foard | 75—76 |

FOREIGN PATENTS

| | | | |
|---|---|---|---|
| 10,014 | 6/1963 | Japan | 75—76 |

OTHER REFERENCES

Deoxidation of Blister Copper, Metal Industry, pp. 87–88, Jan. 17, 1963.

L. DEWAYNE RUTLEDGE, Primary Examiner

J. E. LEGRU, Assistant Examiner

U.S. Cl. X.R.

75—75, 93